(12) United States Patent
Tomimatsu et al.

(10) Patent No.: US 6,219,189 B1
(45) Date of Patent: *Apr. 17, 2001

(54) OBJECTIVE LENS UNIT FOR REFLECTIVE FLUORESCENCE AND REFLECTIVE FLUORESCENCE MICROSCOPE HAVING AN OBJECTIVE LENS UNIT FOR REFLECTIVE FLUORESCENCE

(75) Inventors: Kei Tomimatsu, Tokyo; Yoshiyuki Shimizu, Miura, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,327

(22) Filed: Apr. 11, 1997

(30) Foreign Application Priority Data

Apr. 15, 1996 (JP) .................................................. 8-117082

(51) Int. Cl.[7] ............................. G02B 21/02; G02B 21/00
(52) U.S. Cl. .......................... 359/659; 359/368; 359/658; 359/355
(58) Field of Search .................................... 359/350–351, 359/355–357, 361, 368, 385, 656–661

(56) References Cited

U.S. PATENT DOCUMENTS

| | | | |
|---|---|---|---|
| 3,524,694 | * 8/1970 | Klein | 359/657 |
| 4,530,578 | * 7/1985 | Kato | 359/388 |
| 4,770,477 | * 9/1988 | Shafer | 359/355 |
| 4,779,968 | * 10/1988 | Sander | 359/389 |
| 5,142,409 | * 8/1992 | Hanzawa et al. | 359/355 |
| 5,235,465 | * 8/1993 | Hayashi | 359/656 |
| 5,371,624 | * 12/1994 | Nagano et al. | 359/385 |

\* cited by examiner

Primary Examiner—Thong Nguyen
(74) Attorney, Agent, or Firm—Chapman and Cutler

(57) ABSTRACT

A particularly constructed objective lens unit is provided for reflective fluorescence that transmits excitation light well, generates little self-fluorescence, and can correct for various aberrations. The objective lens unit has a front lens group closer to a specimen side than a rear lens group. Among the lens components forming the front lens group, at least the lens components arranged on the specimen side are formed from a prescribed optical material. This optical material has a higher transmissivity for excitation light and generates less fluorescence due to the excitation light than the other lens components forming the objective lens unit. The excitation light, fed into a position path between the front lens group and the rear lens group, is guided through the front lens group to the specimen. An image of the specimen is formed, based on the fluorescence from the specimen, through the front lens group and the rear lens group.

10 Claims, 9 Drawing Sheets

OBJECTIVE LENS UNIT FOR REFLECTIVE FLUORESCENCE AND REFLECTIVE FLUORESCENCE MICROSCOPE HAVING AN OBJECTIVE LENS UNIT FOR REFLECTIVE FLUORESCENCE

BACKGROUND OF THE INVENTION

1. Field of the Invention

This invention pertains to a type of objective lens unit for reflective fluorescence and a type of reflective fluorescence microscope having such an objective lens unit. A reflective fluorescence microscope using the objective lens unit can be used to make an observation from the fluorescence from a specimen due to an excitation light used for reflective illumination.

2. Description of Related Art

A reflective fluorescence microscope is one particular type of microscope. In a reflective fluorescence microscope, short-wavelength excitation light, emitted from a mercury lamp or other light source, is reflectively illuminated in the observational field of view on the specimen. The long-wavelength fluorescence emitted from the specimen is observed. In this specification, an objective lens unit having a front lens group and a rear lens group and used in a reflective fluorescence microscope is referred to as an objective lens unit for reflective fluorescence.

In a conventional reflective fluorescence microscope, the excitation light from a light source is reflected by a dichroic mirror toward an objective lens. From an aperture on the image side of the objective lens, the excitation light is incident on the specimen along an optical axis. In this type of conventional reflective fluorescence microscope, when the specimen is reflectively illuminated, the entire objective lens is used as a condenser lens. When near-UV light is used as the excitation light, it is necessary to select an optical material for the objective lens that has a sufficient transmissivity for, and generates little fluorescence ("self-fluorescence") from, the near-UV light. The reason for this is that if the self-fluorescence of the objective lens reaches the image plane of the reflective fluorescence microscope, then the contrast of the fluorescent image of the specimen, which is the target of observation, is significantly degraded.

Fluorite and fused silica glass are known optical materials having high transmissivity for UV light. High-purity, fused silica glass generates little fluorescence from UV light, but fluorite generates strong fluorescence from UV light. For fluorite, substances have been developed which are characterized by little self-fluorescence generation. On the other hand, for conventional optical glasses, the amount of self-fluorescence generated is several times, and thousands of times in some cases, that of the aforementioned feed materials. Consequently, if only high-purity, fused silica glass and fluorite with prescribed characteristics are used to form the objective lens, then it is possible to realize an objective lens with good UV transmissivity and with little self-fluorescence. Also, the physical characteristics of fused silica glass are much more stable than those of fluorite, and fused silica glass also can be procured easily.

Both fluorite and fused silica glass with good UV transmissivity have small refractive indices. The dispersion rates of these materials are also similar. Consequently, when these two types of optical materials alone are used, it is very difficult to form an objective lens which is properly corrected for chromatic and other aberrations and which has a large numerical aperture. Optical materials other than fluorite and fused silica glass with high dispersion power must be incorporated in the objective lens to properly compensate for chromatic and other aberrations and to provide for a large numerical aperture.

As explained above, for a conventional objective lens for reflective fluorescence, it is necessary to use fluorite and fused silica glass. These materials have high excitation light transmissivities and generate little self-fluorescence. However, when the objective lens is made of fluorite and fused silica glass alone, various aberrations cannot be corrected very well. On the other hand, if optical materials having high dispersion power are included to properly correct for the various aberrations in the objective lens unit, then the total amount of self-fluorescence generated by the objective lens increases. This is a disadvantage.

SUMMARY OF THE INVENTION

The purpose of this invention is to solve the problems of the conventional lens construction mentioned above by providing a type of objective lens unit for reflective fluorescence which allows the excitation light to pass through, generates little self-fluorescence, and can properly correct for the various aberrations. A type of reflective fluorescence microscope equipped with this type of objective lens unit for reflective fluorescence is also provided.

One object of this invention is to provide a particular type of improved objective lens unit for reflective fluorescence. This objective lens unit is used in a reflective fluorescence microscope, in which fluorescence is observed from a specimen under excitation light. The excitation light is used for reflective illumination. The objective lens unit forms an image of the specimen based on the fluorescence from the specimen.

The objective lens unit has a front lens group close to a specimen side of the unit and a rear lens group farther from the specimen side than the front lens group.

Among lens components forming the front lens group, at least the lens components arranged on the specimen side are formed from a prescribed optical material. This prescribed optical material has a substantially higher transmissivity with respect to the aforementioned excitation light. Substantially less fluorescence is generated by these lens components due to the excitation light than by the other lens components forming the objective lens unit for reflective fluorescence.

The excitation light fed into a position path between the front lens group and the rear lens group is guided through the front lens group to the specimen. An image of the specimen is formed based on fluorescence from the specimen through the front lens group and the rear lens group.

Preferably, a semitransparent film is placed so that the excitation light is reflected and guided to the specimen. The fluorescence, which arrives from the specimen through the front lens group, is transmitted through the film. Also, it is preferred that all of the lens components forming the front lens group be made of the prescribed optical material.

Another object of the invention is to provide a particular type of improved reflective fluorescence microscope in which the specimen is reflectively irradiated by excitation light. An image of the specimen formed by the fluorescence from the specimen and due to the excitation light is observed. The reflective fluorescence microscope has an objective lens unit including a front lens group and a rear lens group. An excitation light supply is used for supplying the excitation light to an optical path between the front lens group and the rear lens group. A semitransparent film, which is arranged in the optical path between the front lens group and the rear lens group, reflects the excitation light supplied from the excitation light supply to the specimen. The film, however, transmits the fluorescence which arrives from the specimen through the front lens group.

Among the lens components forming the front lens group, at least the lens components arranged on the specimen side are formed from a prescribed optical material. This material has a substantially higher transmissivity with respect to the excitation light and substantially less fluorescence generated by the excitation light than the other lens components forming the objective lens unit for reflective fluorescence.

A second semitransparent film reflects or absorbs the excitation light transmitted through the semitransparent film while transmitting the fluorescence transmitted through the semitransparent film. An absorptive part is provided for absorbing the excitation light that has passed through the semitransparent film arranged for reflecting the excitation light. This excitation light is guided away from the optical path between the front lens group and the rear lens group.

The objective lens unit of this invention is divided into a front lens group and a rear lens group. The front lens group is located closer to the specimen side of the unit. The excitation light supplied to the optical path between the front lens group and the rear lens group is reflected by a dichroic mirror or other semitransparent film. The reflected excitation light is guided through the front lens group to the specimen, and an image of the specimen is formed by the fluorescence from the specimen through the front lens group and the rear lens group. Among the lens components forming the front lens group, at least the lens components arranged on the specimen side are formed of high-purity, fused silica glass or other optical material that has a high transmissivity for and generates little fluorescence from the excitation light.

A conventional objective lens has the entire objective lens acting as a condenser lens. Only the front lens group of the condenser lens unit of this invention plays the role of a condenser lens. Consequently, the total volume of the lens components of the front lens group through which the excitation light passes is smaller than the total volume of all of the lens components of the objective lens unit through which the excitation light passes in the prior art. In addition, as explained above, most of the front lens group is formed from an optical material that has a high transmissivity for the excitation light and generates little self-fluorescence. Consequently, for the objective lens unit for reflective fluorescence of this invention, the excitation light transmissivity is high while the self-fluorescence is low.

After the excitation light is reflected by the semitransparent film arranged between the front lens group and the rear lens group, the excitation light is incident on the specimen through the front lens group. Consequently, the excitation light reflected by the surface of the specimen and the surfaces of the various lens components forming the front lens group is blocked by the semitransparent film so that it cannot reach the rear lens group. Since the excitation light cannot pass through the rear lens group, it is possible to make use of a conventional optical material to manufacture the rear lens group. It is possible, therefore, to use the rear lens group to correct for the aberration in the light rays after going through the front lens group.

This invention, therefore, realizes a type of objective lens unit for reflective fluorescence that transmits the excitation light well, generates little self-fluorescence, and can correct for various aberrations well. A reflective fluorescence microscope can be equipped with this type of objective lens unit for reflective fluorescence. As a result, even for specimens that can generate only weak fluorescence under excitation light, good reflective fluorescence observations still can be performed.

Only the front lens group of the inventive construction acts as the condenser lens. In this case, among the lens components forming the front lens group, the lens component on the specimen side has focused excitation light transmitted through it. This component, therefore, generates intense self-fluorescence. Since the lens component on the specimen side is closer to the specimen, the self-fluorescence from the lens component on the specimen side can reach the image plane more easily. This image plane is optically conjugate to the specimen. Among the lens components forming the front lens group, as the lens component becomes closer to the specimen, the intensity of the self-fluorescence generated becomes greater and the generated self-fluorescence reaches the image plane more easily. In other words, the lens component near the rear lens group has a smaller influence on self-fluorescence generation. Consequently, among the lens components forming the front lens group, the lens component near the rear lens group may be made of fluorite or another optical material that has a high excitation light transmissivity and yet generates a certain amount of self-fluorescence.

In order to properly compensate for magnification chromic aberration or other aberrations, it is preferred that the light rays incident on the rear lens group be divergent light rays. However, if the divergence is large, then a problem is presented, since the reflectivity characteristics of the dichroic mirror and other semitransparent films depend on the incident angle of the light rays. Consequently, it is preferred that the light rays, after going through the front lens group, be nearly parallel, divergent light rays. An angle of divergence of the light rays with respect to the optical axis is preferably 5° or less.

DESCRIPTION OF THE PREFERRED EMBODIMENTS

Figure 1:
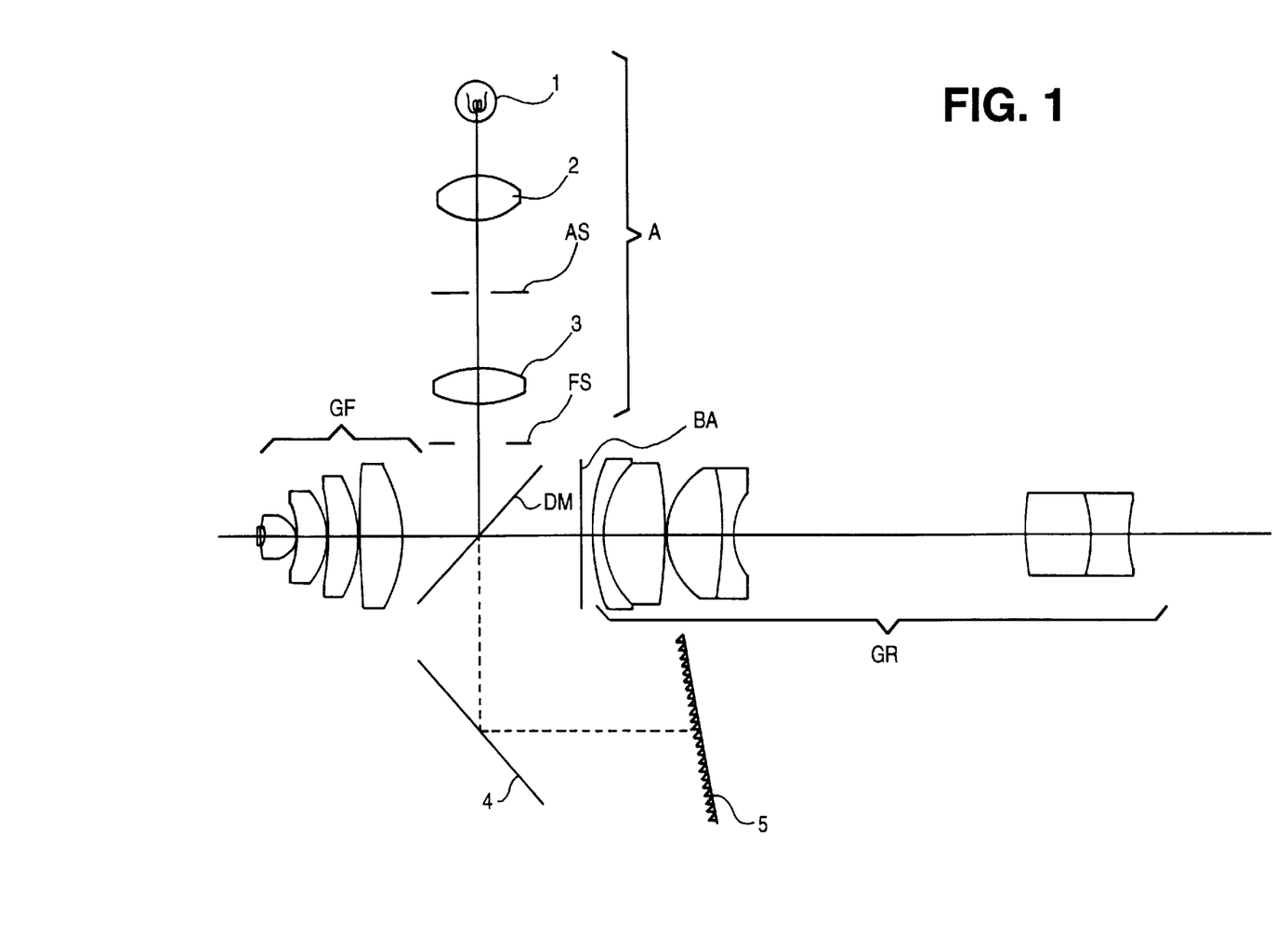
FIG. 1 is a schematic diagram illustrating the structure of the main portion of the reflective fluorescence microscope of this invention.

FIG. 1 is a schematic illustration of a reflective fluorescence microscope and shows the microscope as having an illuminating unit A as an excitation light supply means for supplying the UV or other excitation light. In illuminating system A, excitation light from a light source 1 is collected and focused by a collector lens 2. Subsequently, the excitation light is incident, through a relay lens 3, on a dichroic mirror DM. An aperture stop AS is arranged at the imaging position between the collector lens 2 and the relay lens 3, and a field-of-view stop FS is arranged after the relay lens 3.

The excitation light reflected by the dichroic mirror DM goes through front lens group GF and reflectively illuminates the observational field-of-view region of the specimen. The specimen and field-of-view stop FS are placed in optically conjugate positions, and the observational field-of-view region is defined so as to correspond to the shape and size of the opening portion of the field-of-view stop FS. The lens components forming the front lens group GF are made of high-purity, fused silica glass or another optical material having high excitation light transmissivity and generating little self-fluorescence.

After the fluorescence from the specimen due to the excitation light from the light source 1 is condensed by front lens group GF of the objective lens unit, it then passes through the dichroic mirror DM. This dichroic mirror DM has characteristics such that the excitation light from the light source 1 is reflected from the mirror while the fluorescence from the specimen is transmitted through the mirror.

The fluorescence that has passed through the dichroic mirror DM is incident on a barrier filter BA. The barrier filter BA has characteristics similar to the dichroic mirror DM; excitation light is reflected or absorbed by the filter while fluorescence is transmitted through the filter. Consequently, the fluorescence that has passed through the barrier filter BA forms a fluorescence image (not shown in the figure) of the specimen through the rear lens group GR of the objective lens unit. The fluorescence image is enlarged and observed through an eyepiece lens unit which is not shown in the figure.

As noted above, the dichroic mirror DM has characteristics such that it reflects the excitation light. However, due to imperfections in the reflective characteristics of the dichroic mirror DM, some of the excitation light from light source 1 is able to pass through the dichroic mirror DM. This excitation light is indicated by a broken line in FIG. 1. When the excitation light that has passed through dichroic mirror DM is incident on the inner wall of the lens barrel, it is scattered. This generates fluorescence from the peripheral parts, and thus deteriorates the contrast of the observed image. After the excitation light from light source 1 has passed through the dichroic mirror DM and is reflected by the reflective part 4, therefore, the excitation light is absorbed by an absorptive part 5. In this way, due to the functions of the reflective part 4 and the absorptive part 5, it is possible to prevent the excitation light, which was emitted from the light source 1 and has passed through dichroic mirror DM, from scattering and generating fluorescence detrimental to observation.

When the excitation light reflected by the dichroic mirror DM passes through the front lens group GF, it is reflected by the surfaces of various lenses and is incident again on the dichroic mirror DM. While most of the excitation light incident again on dichroic mirror DM is reflected, a portion of the excitation light may still pass through the dichroic mirror DM due to imperfections in the reflective characteristics of the dichroic mirror DM. When the excitation light, which has passed through the dichroic mirror DM, is incident on a rear lens group GR, self-fluorescence is generated in the rear lens group GR. This might produce deterioration in the contrast of the observed fluorescence image.

The excitation light which has passed through the dichroic mirror DM and is reflected from the surfaces of various lenses is reflected or absorbed by barrier filter BA. As a result, the excitation light cannot reach rear lens group GR in the construction shown in FIG. 1. In this way, due to the function of the barrier filter BA, it is possible to prevent generation of self-fluorescence by the rear lens group due to incident excitation light that has passed through the dichroic mirror DM and is reflected by the surfaces of the various lenses into the rear lens group. In place of the barrier filter BA, it is possible to form a dichroic film on the surface of the rear lens group GR nearest to the specimen side.

The excitation light only passes through the front lens group GF of the objective lens unit before it reflectively illuminates the specimen. The front lens group GF is made of high-purity, fused silica glass or another optical material that has a high excitation light transmissivity and generates little self-fluorescence. Consequently, while excitation light transmissivity is high, little self-fluorescence is generated. Since the excitation light does not pass through the rear lens group of the objective lens unit, a conventional optical material may be used to manufacture the rear lens group, and it is possible to use the rear lens group to correct for the various aberrations in the light rays after passing through the front lens group. A good reflective fluorescence observation can be performed even for specimens that generate only weak fluorescence from the excitation light.

The imaging characteristics of the objective lens unit for reflective fluorescence of this invention will now be discussed in connection with numerical examples.

In each numerical example, the objective lens unit for reflective fluorescence has a front lens group GF having a positive refractive power and a rear lens group GR having a negative refractive power. The front lens group is closer to the specimen side than the rear lens group.

NUMERICAL APPLICATION EXAMPLE 1

Figure 2:
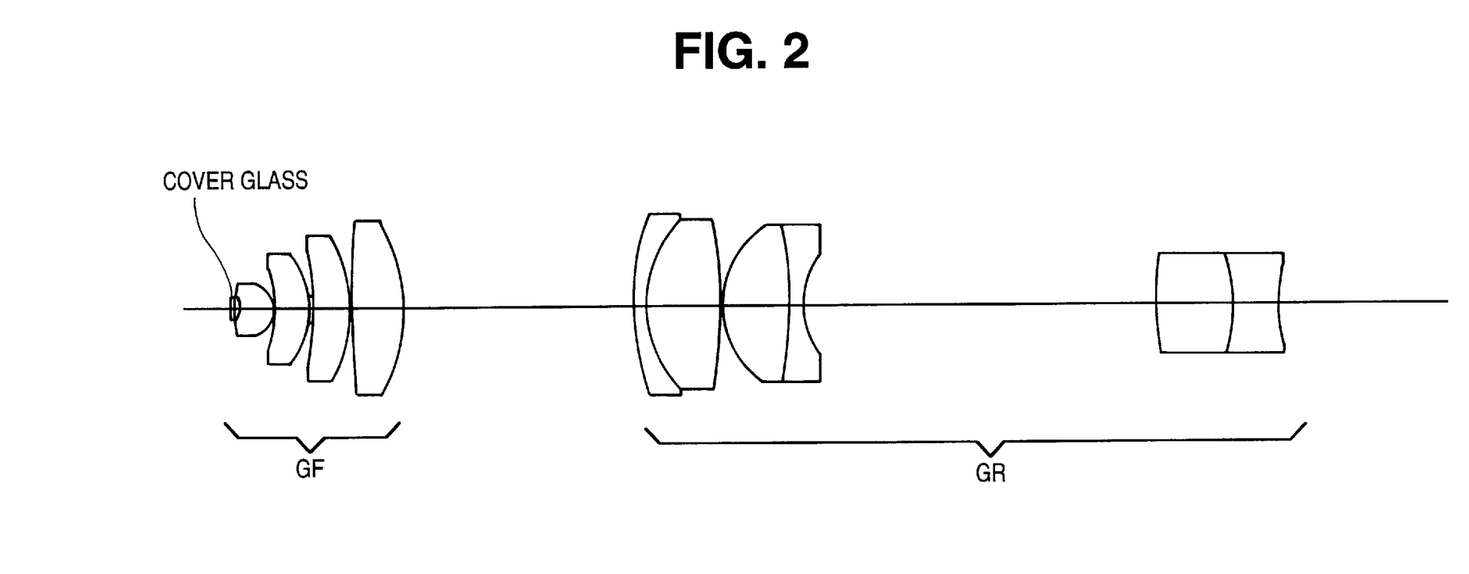
FIG. 2 is an illustration of the objective lens unit for reflective fluorescence according to one embodiment of this invention.

FIG. 2 is a diagram illustrating the construction of the objective lens unit for reflective fluorescence used in Numerical Application Example 1 of this invention. Numerical Application Example 1 is an example in which this invention is applied to a water-immersed objective lens unit. In Numerical Application Example 1, all of the four lens components forming the front lens group GF are made of high-purity, fused silica glass. The cover glass is also made of high-purity, fused silica glass.

In the objective lens unit shown in FIG. 2, counting from the specimen side, the front lens group GF includes a positive meniscus lens with a concave surface facing the specimen side, a positive meniscus lens with a concave surface facing the specimen side, a positive meniscus lens with a concave surface facing the specimen side, and a biconvex lens. The rear lens group GR, counting from the specimen side, includes a joint positive lens made of a negative meniscus lens with a convex surface facing the specimen side and a biconvex lens, a joint negative lens made of a biconvex lens and a biconcave lens, and a joint negative lens made of a biconvex lens and a biconcave lens.

In Table I below, the values of the various parameters of Numerical Application Example 1 of this invention are listed. In Table I, NA stands for the numerical aperture, and β represents the magnification. The thickness of the cover glass is 0.17 mm and the distance between the cover glass and the first lens surface is 0.125 mm. The gap is filled with water. The distance between the cover glass and the specimen is 0.12 mm and is also filled with water. The refractive index with respect to the D line of water (λ=587.63 nm) is 1.33306, and the Abbe number of water is 53.98.

The number on the left-hand side refers to the lens surface number as counted from the object side of the system. The letter r represents the radius of curvature, in mm, of the lens surface. The letter d represents the distance, in mm, between lens surfaces, and n and ν represent the refractive index and Abbe number, respectively, for the D line (λ=587.63 nm).

TABLE I

NA = 1.15
β = 100

| | r | d | n | ν | |
|---|---|---|---|---|---|
| 1 | −2.961 | 2.00000 | 1.45847 | 67.8 | GF |
| 2 | −1.453 | 0.05000 | | | |
| 3 | −6.030 | 2.20000 | 1.45847 | 67.8 | |
| 4 | −4.228 | 0.10000 | | | |
| 5 | −17.912 | 2.00000 | 1.45847 | 67.8 | |
| 6 | −7.526 | 0.10000 | | | |
| 7 | 81.826 | 3.00000 | 1.45847 | 67.8 | |
| 8 | −10.528 | 14.00000 | | | |
| 9 | 13.525 | 0.80000 | 1.67270 | 32.2 | GR |
| 10 | 6.378 | 4.50000 | 1.43388 | 95.2 | |
| 11 | −26.319 | 0.10000 | | | |
| 12 | 5.126 | 3.99000 | 1.43388 | 95.2 | |
| 13 | −23.465 | 0.80000 | 1.67270 | 32.2 | |
| 14 | 4.349 | 21.30000 | | | |
| 15 | 33.011 | 4.52000 | 1.74077 | 27.6 | |
| 16 | −10.866 | 3.14000 | 1.51860 | 70.0 | |
| 17 | 11.180 | | | | |

Figure 3A:
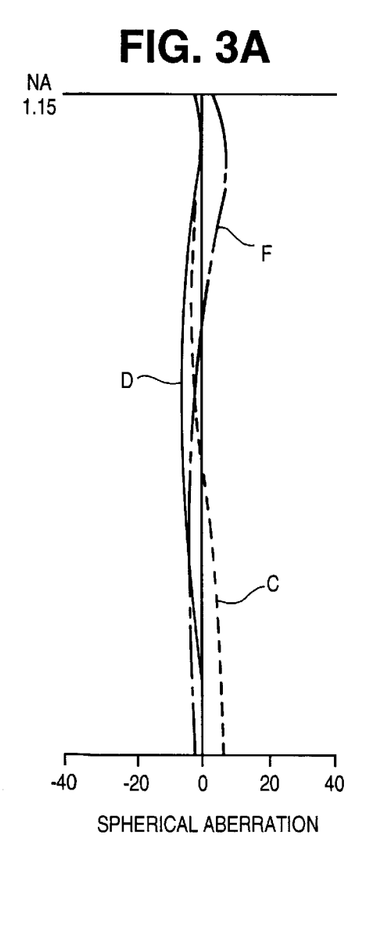
FIG. 3 shows diagrams of various aberrations in the first embodiment.
Figure 3B:
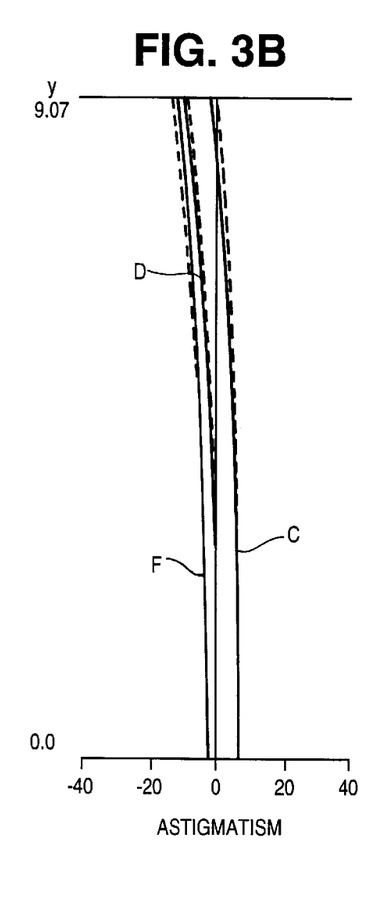
Figure 3C:
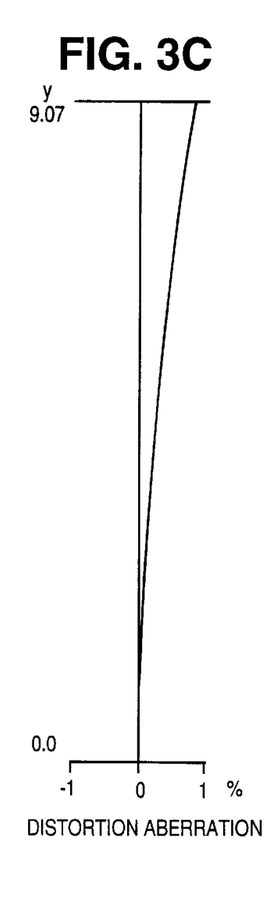

FIG. 3 shows diagrams illustrating various aberrations in Numerical Application Example 1.

In the various aberration diagrams, NA stands for the numerical aperture, y represents the image height in mm, D represents the D line (λ=587.6 nm), C represents the C line (λ=656.3 nm), and F represents the F line (λ=486.1 nm). In the aberration diagram illustrating astigmatism, the broken lines represent the meridional image plane, while the solid lines represent the sagittal image plane.

As can be seen from the various aberration diagrams, in this Numerical Application Example, the various aberrations can be well-corrected.

NUMERICAL APPLICATION EXAMPLE 2

Figure 4:
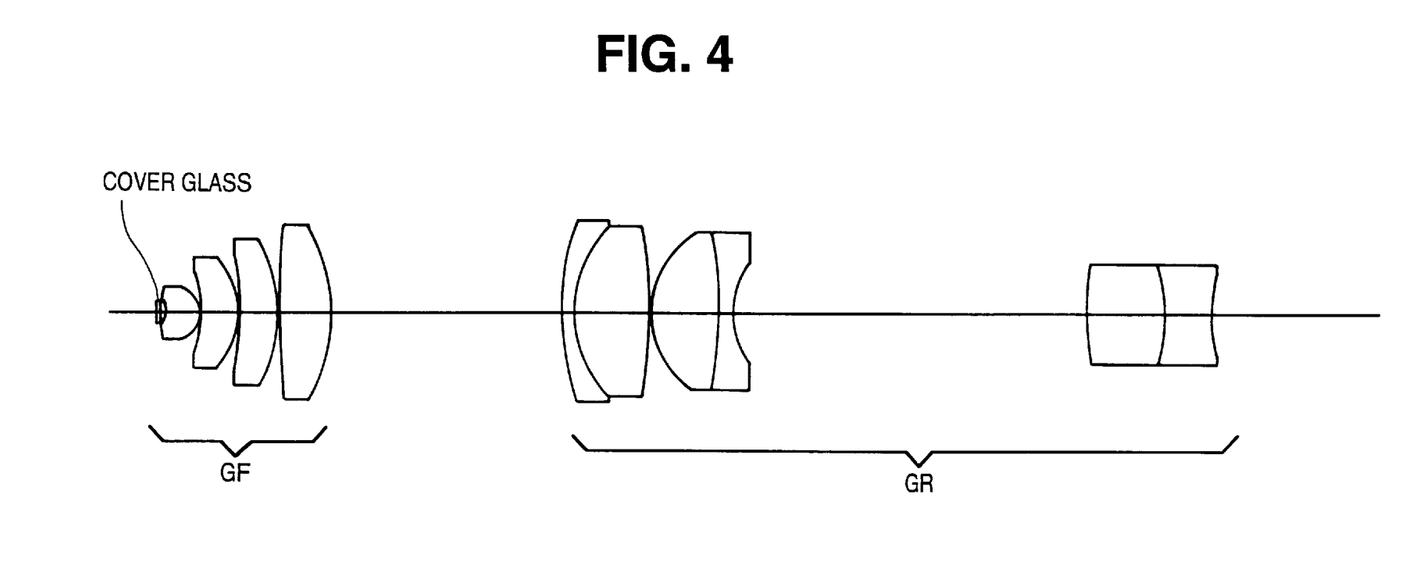
FIG. 4 is an illustration of the objective lens unit for reflective fluorescence according to another embodiment.

FIG. 4 is a diagram illustrating the construction of the objective lens unit for reflective fluorescence used in Numerical Application Example 2 of this invention. Numerical Application Example 2 is another example in which this invention is applied to a water-immersed objective lens unit. In Numerical Application Example 2, among the four lens components forming front lens group GF, the three lens components on the specimen side are made of high-purity, fused silica glass, while the lens component on the side of the rear lens group is made of fluorite. The cover glass is also made of high-purity, fused silica glass.

In the objective lens unit shown in FIG. 4, counting from the specimen side, the front lens group GF includes a positive meniscus lens with a concave surface facing the specimen side, a positive meniscus lens with a concave surface facing the specimen side, a positive meniscus lens with a concave surface facing the specimen side, and a biconvex lens. The rear lens group GR, counting from the specimen side, includes a joint positive lens made of a negative meniscus lens with a convex surface facing the specimen side and a biconvex lens, a joint negative lens made of a biconvex lens and a biconcave lens, and a joint negative lens made of a biconvex lens and a biconcave lens.

In Table II below, the values of the various parameters of Numerical Application Example 2 of this invention are listed. In Table II, NA stands for the numerical aperture, and β represents the magnification. The thickness of the cover glass is 0.17 mm and the distance between the cover glass and the first lens surface is 0.125 mm. The gap is filled with water. The distance between the cover glass and the specimen is 0.12 mm and is also filled with water. The refractive index with respect to the D line of water (λ=587.63 nm) is 1.33306, and the Abbe number of water is 53.98.

The number on the left-hand side refers to the lens surface number as counted from the object side of the system. The letter r represents the radius of curvature, in mm, of the lens surface. The letter d represents the distance, in mm, between lens surfaces, and n and ν represent the refractive index and Abbe number, respectively, for the D line (λ=587.63 nm).

TABLE II

NA = 1.15
β = 100

| | r | d | n | ν | |
|---|---|---|---|---|---|
| 1 | −2.974 | 2.00000 | 1.45847 | 67.8 | GF |
| 2 | −1.453 | 0.05000 | | | |
| 3 | −5.194 | 2.20000 | 1.45847 | 67.8 | |
| 4 | −4.033 | 0.10000 | | | |
| 5 | −16.676 | 2.00000 | 1.45847 | 67.8 | |
| 6 | −6.974 | 0.10000 | | | |
| 7 | 77.183 | 3.00000 | 1.43388 | 95.2 | |
| 8 | −11.021 | 14.00000 | | | |
| 9 | 13.702 | 0.80000 | 1.67270 | 32.2 | GR |
| 10 | 6.761 | 4.50000 | 1.43388 | 95.2 | |
| 11 | −28.931 | 0.10000 | | | |
| 12 | 5.604 | 3.99000 | 1.49782 | 82.5 | |
| 13 | −50.978 | 0.80000 | 1.67270 | 32.2 | |
| 14 | 4.801 | 21.30000 | | | |
| 15 | 31.609 | 4.52000 | 1.74077 | 27.6 | |
| 16 | −11.355 | 3.14000 | 1.51860 | 70.0 | |
| 17 | 10.391 | | | | |

Figure 5A:
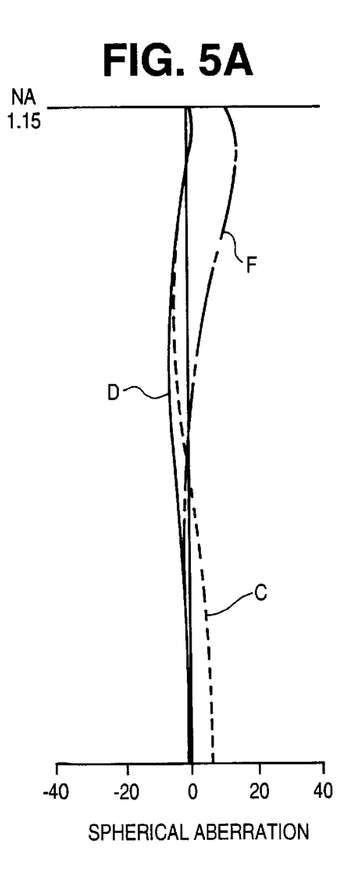
FIG. 5 shows diagrams of various aberrations in the embodiment of FIG. 4.
Figure 5B:
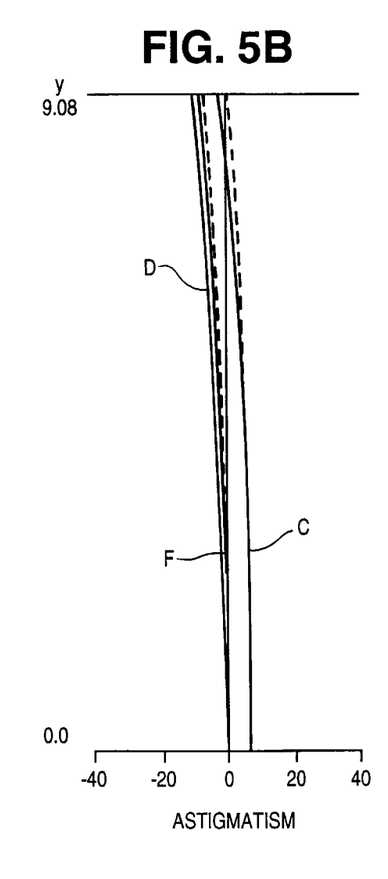
Figure 5C:
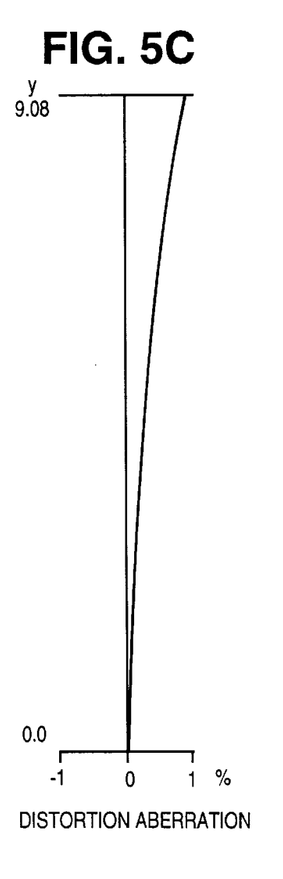

FIG. 5 shows diagrams illustrating various aberrations in Numerical Application Example 2.

In the various aberration diagrams, NA stands for the numerical aperture, y represents the image height in mm, D represents the D line (λ=587.6 nm), C represents the C line (λ=656.3 nm), and F represents the F line (λ=486.1 nm). In the aberration diagram illustrating astigmatism, the broken lines represent the meridional image plane, while the solid lines represent the sagittal image plane.

As can be seen from the various aberration diagrams, in this numerical application example, the various aberrations can be well-corrected.

NUMERICAL APPLICATION EXAMPLE 3

Figure 6:
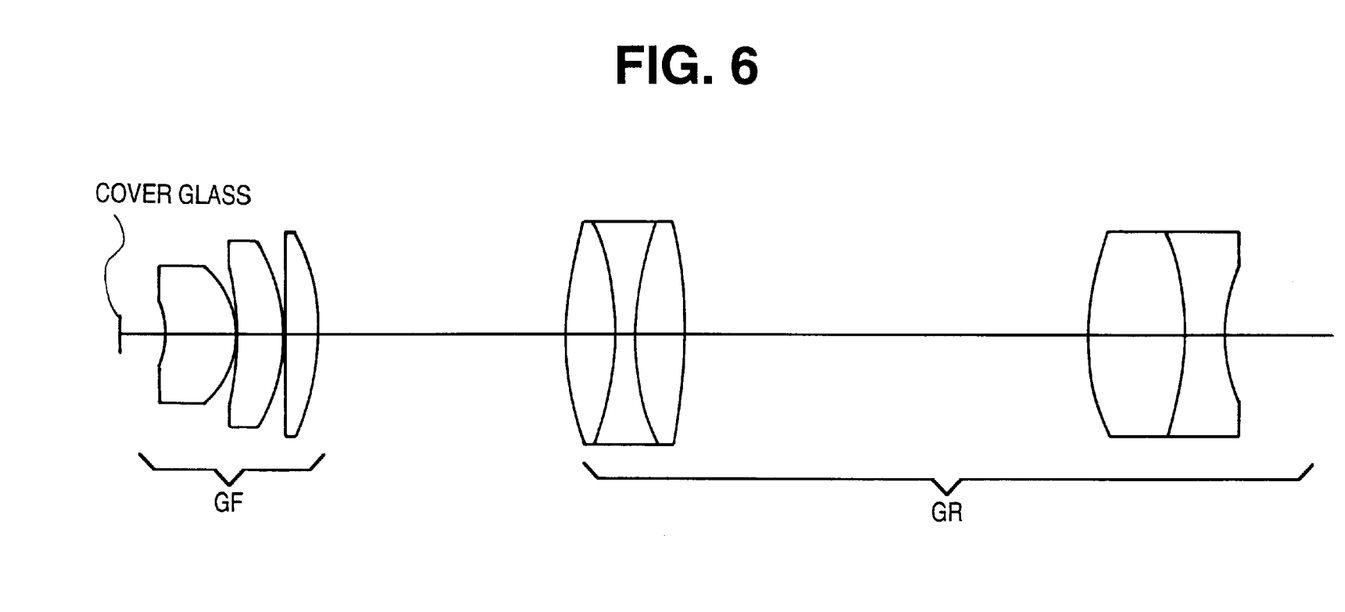
FIG. 6 is an illustration of the objective lens unit for reflective fluorescence according to another embodiment.

FIG. 6 is a diagram illustrating the construction of the objective lens unit for reflective fluorescence used in Numerical Application Example 3 of this invention. Numerical Application Example 3 is an example in which this invention is applied to a dry objective lens unit. In Numerical Application Example 3, all of the three lens components forming the front lens group GF are made of high-purity, fused silica glass. The cover glass is also made of high-purity, fused silica glass.

In the objective lens unit shown in FIG. 6, counting from the specimen side, the front lens group GF includes a positive meniscus lens with a concave surface facing the specimen side, a positive meniscus lens with a concave surface facing the specimen side, and a biconvex lens. The rear lens group GR, counting from the specimen side, includes a joint positive lens made of a biconvex lens, a biconcave lens and biconvex lens, and a joint negative lens made of a biconvex lens and a biconcave lens.

In Table III below, the values of the various parameters of Numerical Application Example 3 of this invention are listed. In Table III, NA stands for the numerical aperture, and β represents the magnification. The thickness of the cover glass is 0.17 mm and the air gap between the cover glass and the first lens surface is 1.9 mm.

The number on the left-hand side refers to the lens surface number as counted from the object side of the system. The letter r represents the radius of curvature, in mm, of the lens surface. The letter d represents the distance, in mm, between lens surfaces, and n and ν represent the refractive index and Abbe number, respectively, for the D line (λ=587.63 nm).

TABLE III

NA = 0.55
β = 30

| | r | d | n | ν | |
|---|---|---|---|---|---|
| 1 | −3.88426 | 3.90000 | 1.458504 | 67.85 | GF |
| 2 | −4.38198 | 0.10000 | | | |
| 3 | −13.85216 | 2.50000 | 1.458504 | 67.85 | |
| 4 | −8.08739 | 0.10000 | | | |
| 5 | 362.83524 | 2.00000 | 1.458504 | 67.85 | |
| 6 | −10.94821 | 14.00000 | | | |
| 7 | 15.60344 | 2.99000 | 1.433880 | 95.25 | GR |
| 8 | −14.53413 | 1.00000 | 1.672700 | 32.17 | |
| 9 | 12.12449 | 2.99797 | 1.433880 | 95.25 | |
| 10 | −24.99801 | 23.00287 | | | |
| 11 | 15.63934 | 5.50087 | 1.723421 | 37.90 | |
| 12 | −14.99958 | 2.13894 | 1.563840 | 60.68 | |
| 13 | 7.87014 | 197.01410 | | | |

Figure 7A:
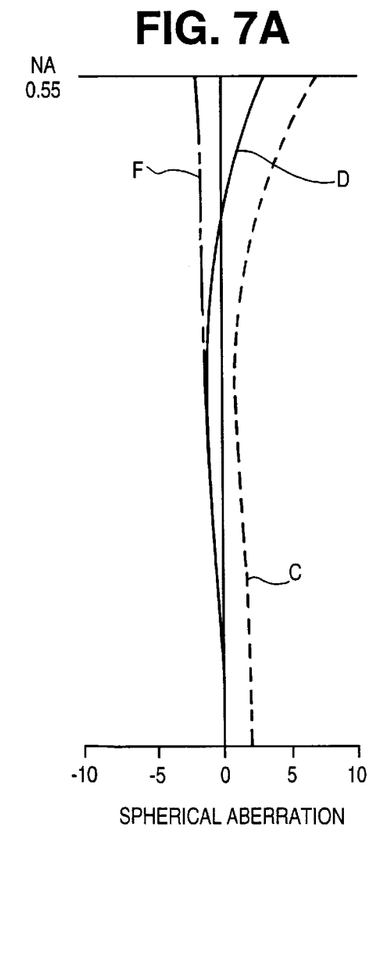
FIG. 7 shows diagrams of various aberrations in the embodiment of FIG. 6.
Figure 7B:
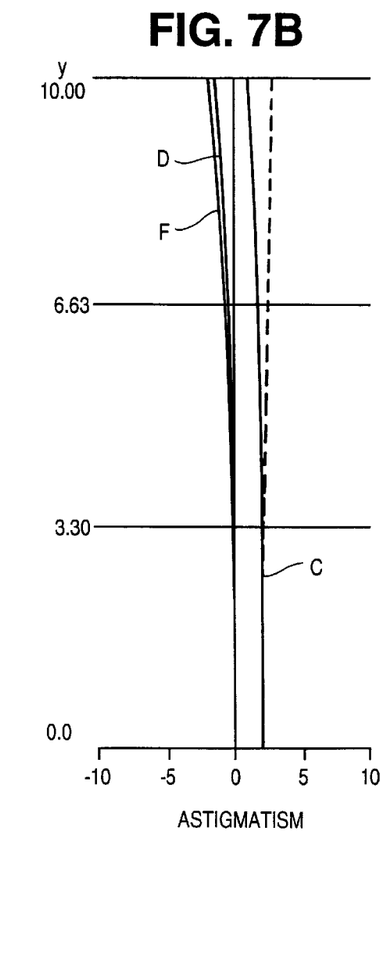
Figure 7C:
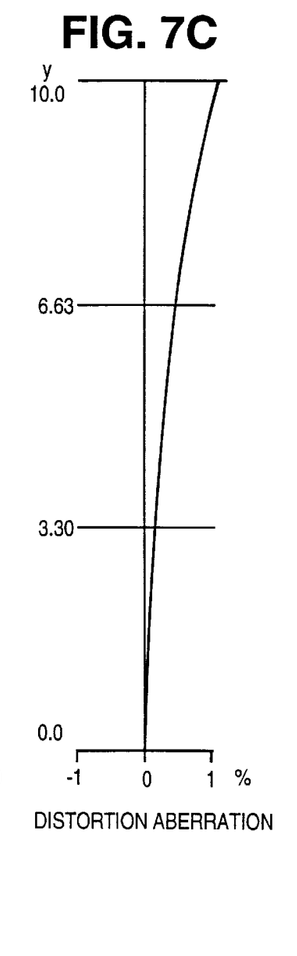

FIG. 7 shows diagrams illustrating various aberrations in Numerical Application Example 3.

In the various aberration diagrams, NA stands for the numerical aperture, y represents the image height in mm, D represents the D line (λ=587.6 nm), C represents the C line (λ=656.3 nm), and F represents the F line (λ=486.1 nm). In the aberration diagram illustrating astigmatism, the broken lines represent the meridional image plane, while the solid lines represent the sagittal image plane.

As can be seen from the various aberration diagrams, in this numerical application example, the various aberrations can be well-corrected.

NUMERICAL APPLICATION EXAMPLE 4

Figure 8:
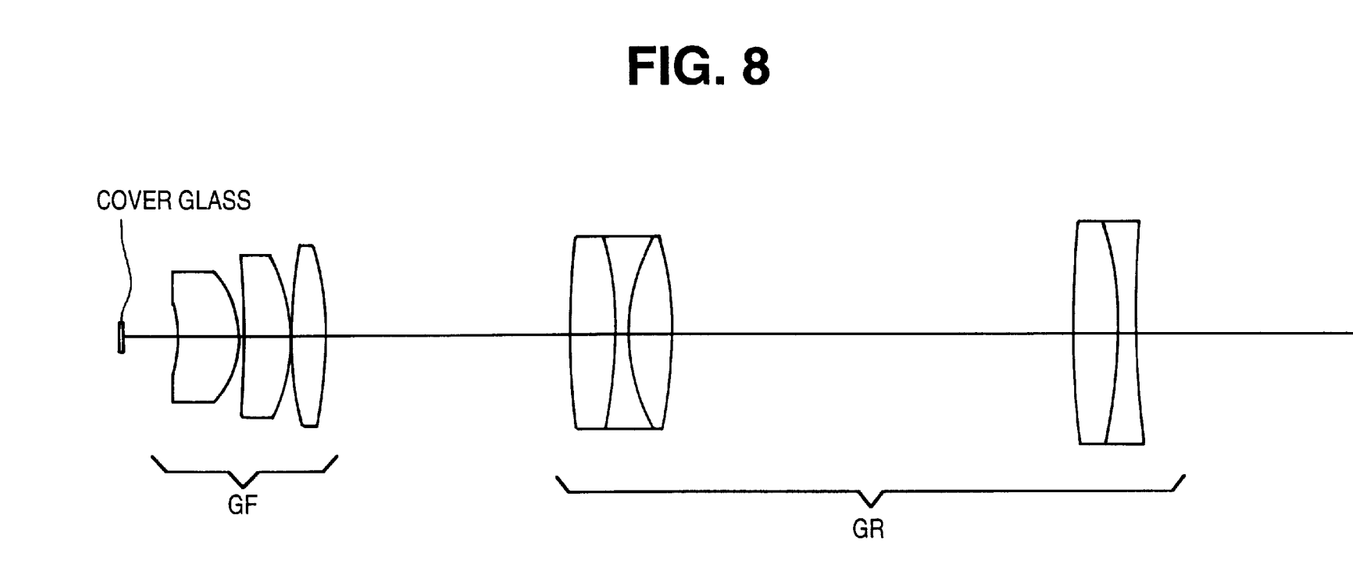
FIG. 8 is an illustration of the objective lens unit for reflective fluorescence according to yet another embodiment.

FIG. 8 is a diagram illustrating the construction of the objective lens unit for reflective fluorescence used in Numerical Application Example 4 of this invention. Numerical Application Example 4 is an example in which this invention is applied to a dry objective lens unit. In Numerical Application Example 4, all of the three lens components forming the front lens group GF are made of high-purity, fused silica glass. The cover glass is also made of high-purity, fused silica glass.

In the objective lens unit shown in FIG. 8, counting from the specimen side, the front lens group GF includes a positive meniscus lens with a concave surface facing the specimen side, a positive meniscus lens with a concave surface facing the specimen side, and a biconvex lens. The rear lens group GR, counting from the specimen side, includes a joint positive lens made of a biconvex lens, a biconcave lens and biconvex lens, and a joint negative lens made of a biconvex lens and a biconcave lens.

In Table IV below, the values of the various parameters of Numerical Application Example 4 of this invention are listed. In Table IV, NA stands for the numerical aperture, and β represents the magnification. The thickness of the cover glass is 0.17 mm and the air gap between the cover glass and the first lens surface is 3.0 mm.

The number on the left-hand side refers to the lens surface number as counted from the object side of the system. The letter r represents the radius of curvature, in mm, of the lens surface. The letter d represents the distance, in mm, between lens surfaces, and n and ν represent the refractive index and Abbe number, respectively, for the D line (λ=587.63 nm).

TABLE IV

NA = 0.5
β = 20

| | r | d | n | ν | |
|---|---|---|---|---|---|
| 1 | −5.61316 | 3.50000 | 1.458470 | 67.8 | GF |
| 2 | −5.02660 | 0.10000 | | | |
| 3 | −40.18072 | 2.50000 | 1.458470 | 67.8 | |
| 4 | −9.19259 | 0.10000 | | | |
| 5 | 22.56930 | 2.00000 | 1.458470 | 67.8 | |
| 6 | −20.41608 | 14.00000 | | | |
| 7 | 36.79404 | 2.50000 | 1.497820 | 82.5 | GR |
| 8 | −22.81308 | 0.80000 | 1.717360 | 29.5 | |
| 9 | 10.56917 | 2.50000 | 1.433880 | 95.2 | |
| 10 | −18.87742 | 23.20000 | | | |
| 11 | 81.94171 | 2.50000 | 1.756920 | 31.6 | |
| 12 | −22.78129 | 1.00000 | 1.568829 | 56.0 | |
| 13 | 72.35572 | 202.12944 | | | |

Figure 9A:
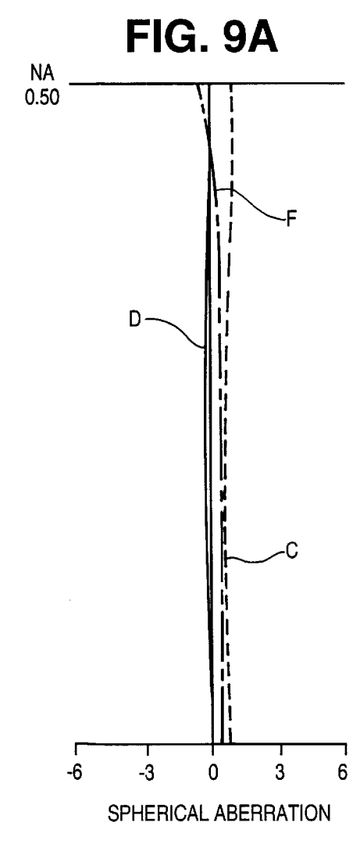
FIG. 9 shows diagrams of various aberrations in the embodiment of FIG. 8.
Figure 9B:
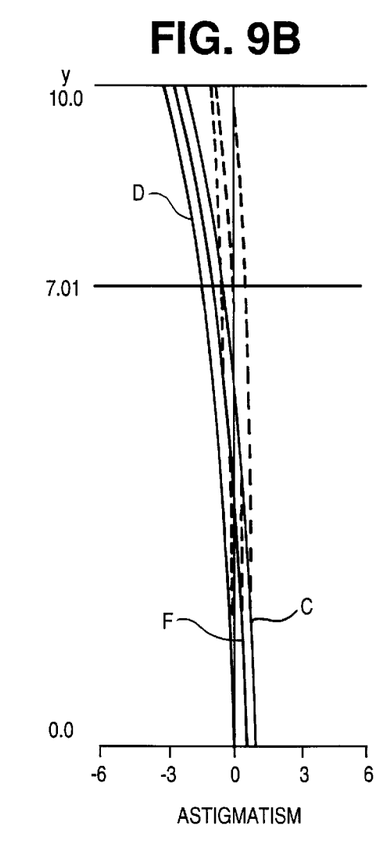
Figure 9C:
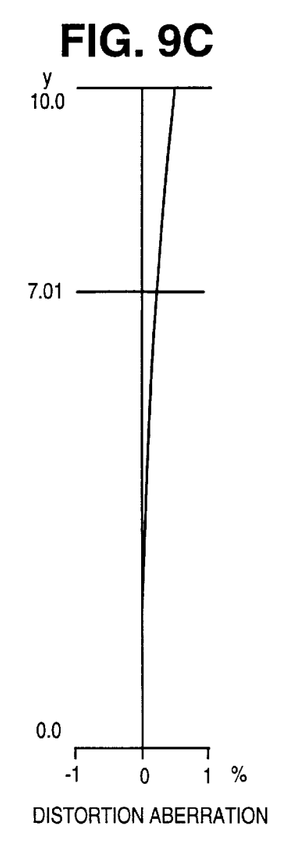

FIG. 9 shows diagrams illustrating various aberrations in Numerical Application Example 4.

In the various aberration diagrams, NA stands for the numerical aperture, y represents the image height in mm, D represents the D line (λ=587.6 nm), C represents the C line (λ=656.3 nm), and F represents the F line (λ=486.1 nm). In the aberration diagram illustrating astigmatism, the broken lines represent the meridional image plane, while the solid lines represent the sagittal image plane.

As can be seen from the various aberration diagrams, in this numerical application example, the various aberrations can be well-corrected.

As is explained above, according to this invention, it is possible to form a type of objective lens unit for reflective fluorescence that transmits excitation light well, generates little self-fluorescence, and corrects properly for various aberrations. A type of reflective fluorescence microscope equipped with such an objective lens unit is also possible. As a result, a good observation of the reflective fluorescence can be made even when excitation light generates only weak fluorescence from a specimen.

What is claimed is:

1. An objective lens unit for reflective fluorescence and used in a reflective fluorescence microscope, in which fluorescence from a specimen under visible excitation light for reflective illumination is observed, and an image of the specimen based on the fluorescence from the specimen is formed, comprising:
 a front lens group including a plurality of lens components made of a high-purity, fused silica glass; and
 a rear lens group farther away from a specimen side than said front lens group;
 wherein said plurality of lens components in the front lens group is arranged on the specimen side and has a higher transmissivity with respect to the excitation light and less fluorescence generated due to the excitation light than other lens components forming the objective lens unit;

the excitation light being fed into an optical path between the front lens group and the rear lens group and guided through the front lens group to the specimen; and an image of the specimen being formed by fluorescence from the specimen through the front lens group and the rear lens group, said rear lens group correcting various types of fluorescence aberrations after the light passes through said front lens group.

2. The objective lens unit defined in claim 1 wherein the front lens group transforms fluorescent rays from the specimen to nearly parallel divergent light rays.

3. The objective lens unit defined in claim 1, further comprising a dichroic mirror placed in the optical path between the front lens group and the rear lens group so that the excitation light is reflected and guided to the specimen while the fluorescence from the specimen through the front lens group is transmitted through the mirror, and a barrier filter which transmits the fluorescence transmitted through the dichroic mirror.

4. The objective lens unit defined in claim 3, further comprising an absorptive part for absorbing excitation light that has passed through the dichroic mirror and been guided away from the optical path between the front lens group and the rear lens group.

5. The objective lens unit defined in claim 3, wherein the barrier filter reflects the excitation light transmitted through the dichroic mirror.

6. The objective lens unit defined in claim 3, wherein the barrier filter absorbs the excitation light transmitted through the dichroic mirror.

7. A reflective fluorescence microscope in which a specimen is reflectively irradiated by visible excitation light and an image of the specimen formed by fluorescence from the specimen due to the excitation light is observed, comprising:

an objective lens unit including from specimen side to image side a front lens group and a rear lens group, said front lens group having a plurality of lens components made of a high-purity, fused silica glass;

an excitation light supply means for supplying the excitation light to an optical path between the front lens group and the rear lens group;

a dichroic mirror arranged in the optical path between the front lens group and the rear lens group and reflecting the excitation light supplied from the excitation light supply means toward the specimen while transmitting fluorescence that arrives from the specimen through the front lens group;

said plurality of lens components in the front lens group being arranged on the specimen side and has a higher transmissivity with respect to the excitation light and less fluorescence generated from the excitation light than other lens components forming the objective lens unit;

a barrier filter which transmits incident fluorescence which arrives through the mirror; and an absorptive part for absorbing excitation light that has passed through the mirror and been guided away from the optical path between the front lens group and the rear lens group.

8. The reflective fluorescence microscope defined in claim 7, wherein the barrier filter reflects the excitation light transmitted through the mirror.

9. The reflective fluorescence microscope defined in claim 7, wherein the barrier filter absorbs the excitation light transmitted through the mirror.

10. An objective lens unit for a reflective fluorescence microscope, in which fluorescence from a specimen under excitation light for reflective illumination is observed, comprising from a specimen side toward an image side:

a front lens group; and a rear lens group;

said front lens group is formed from an optical material that has a higher transmissivity with respect to the excitation light and less self-fluorescence than said rear lens group;

the excitation light being fed into an optical path between the front lens group and the rear lens group and guided through the front lens group to the specimen; and an image of the specimen being formed from fluorescence from the specimen through the front lens group and the rear lens group, said rear lens group correcting for various aberrations in light rays after passing through the front lens group.

* * * * *